(12) United States Patent
Witte

(10) Patent No.: US 11,220,152 B2
(45) Date of Patent: Jan. 11, 2022

(54) WHEEL SUSPENSION SYSTEM FOR A MOTOR VEHICLE

(71) Applicant: Dr. Ing. h.c. F. Porsche Aktiengesellschaft, Stuttgart (DE)

(72) Inventor: Thomas Witte, Ditzingen-Heimerdingen (DE)

(73) Assignee: Dr. Ing. h.c. F. Porsche Aktiengesellschaft

(*) Notice: Subject to any disclaimer, the term of this patent is extended or adjusted under 35 U.S.C. 154(b) by 464 days.

(21) Appl. No.: 16/250,269

(22) Filed: Jan. 17, 2019

(65) Prior Publication Data
US 2019/0225044 A1 Jul. 25, 2019

(30) Foreign Application Priority Data

Jan. 22, 2018 (DE) .......................... 102018101294.2

(51) Int. Cl.
*B60G 21/02* (2006.01)
*B60G 17/015* (2006.01)
*B60G 17/08* (2006.01)
*B60G 21/073* (2006.01)

(52) U.S. Cl.
CPC ....... *B60G 21/026* (2013.01); *B60G 17/0152* (2013.01); *B60G 17/08* (2013.01); *B60G 21/073* (2013.01); *B60G 2202/24* (2013.01); *B60G 2202/416* (2013.01); *B60G 2204/82* (2013.01);
(Continued)

(58) Field of Classification Search
CPC .... B60G 21/026; B60G 21/073; B60G 17/08; B60G 17/015; B60G 17/0152; B60G 2202/41; B60G 2202/416; B60G 2204/80; B60G 2204/82; B60G 2204/8304; B60G 2500/10; B60G 2202/24; B60G 2800/24; B60G 2800/20

See application file for complete search history.

(56) References Cited

U.S. PATENT DOCUMENTS

| 6,519,517 B1* | 2/2003 | Heyring ............... B60G 21/10 701/37 |
| 7,751,959 B2 | 7/2010 | Boon et al. |
| 7,954,826 B2 | 6/2011 | Hall et al. |
| | | (Continued) |

FOREIGN PATENT DOCUMENTS

| CN | 105691140 A * | 6/2016 |
| DE | 10216132 A1 | 10/2003 |
| | (Continued) | |

OTHER PUBLICATIONS

Description Translation of CN 105691140 from Espacenet (Year: 2016).*

*Primary Examiner* — James A English
*Assistant Examiner* — Daniel M. Keck
(74) *Attorney, Agent, or Firm* — RatnerPrestia

(57) ABSTRACT

A wheel suspension system for a motor vehicle which includes a front axle having two front wheels, to each of which a front hydraulic cylinder is assigned, and a rear axle having two rear wheels, to each of which a rear hydraulic cylinder is assigned. The hydraulic cylinders in a hydraulic system are connected crosswise hydraulically. In order to implement active roll stabilization in a wheel suspension system, a hydraulic pump in the hydraulic system is connected hydraulically between the crosswise-connected hydraulic cylinders.

9 Claims, 1 Drawing Sheet

(52) U.S. Cl.
CPC .. *B60G 2204/8304* (2013.01); *B60G 2500/10* (2013.01)

(56) References Cited

U.S. PATENT DOCUMENTS

| | | | | |
|---|---|---|---|---|
| 2006/0287791 A1* | 12/2006 | Boon | ................ | B60G 17/0152 701/38 |
| 2021/0197640 A1* | 7/2021 | Yamashita | .............. | F16F 9/512 |

FOREIGN PATENT DOCUMENTS

| | | | |
|---|---|---|---|
| DE | 102006028511 A1 | 1/2007 | |
| DE | 60033152 T2 | 12/2007 | |
| DE | 102008028676 A1 | 1/2009 | |
| DE | 102010010869 A1 | 9/2011 | |
| DE | 102013005750 A1 | 10/2014 | |
| WO | 2008141387 A1 | 11/2008 | |
| WO | WO-2020113287 A1 * | 6/2020 | ............. B63B 39/00 |

* cited by examiner

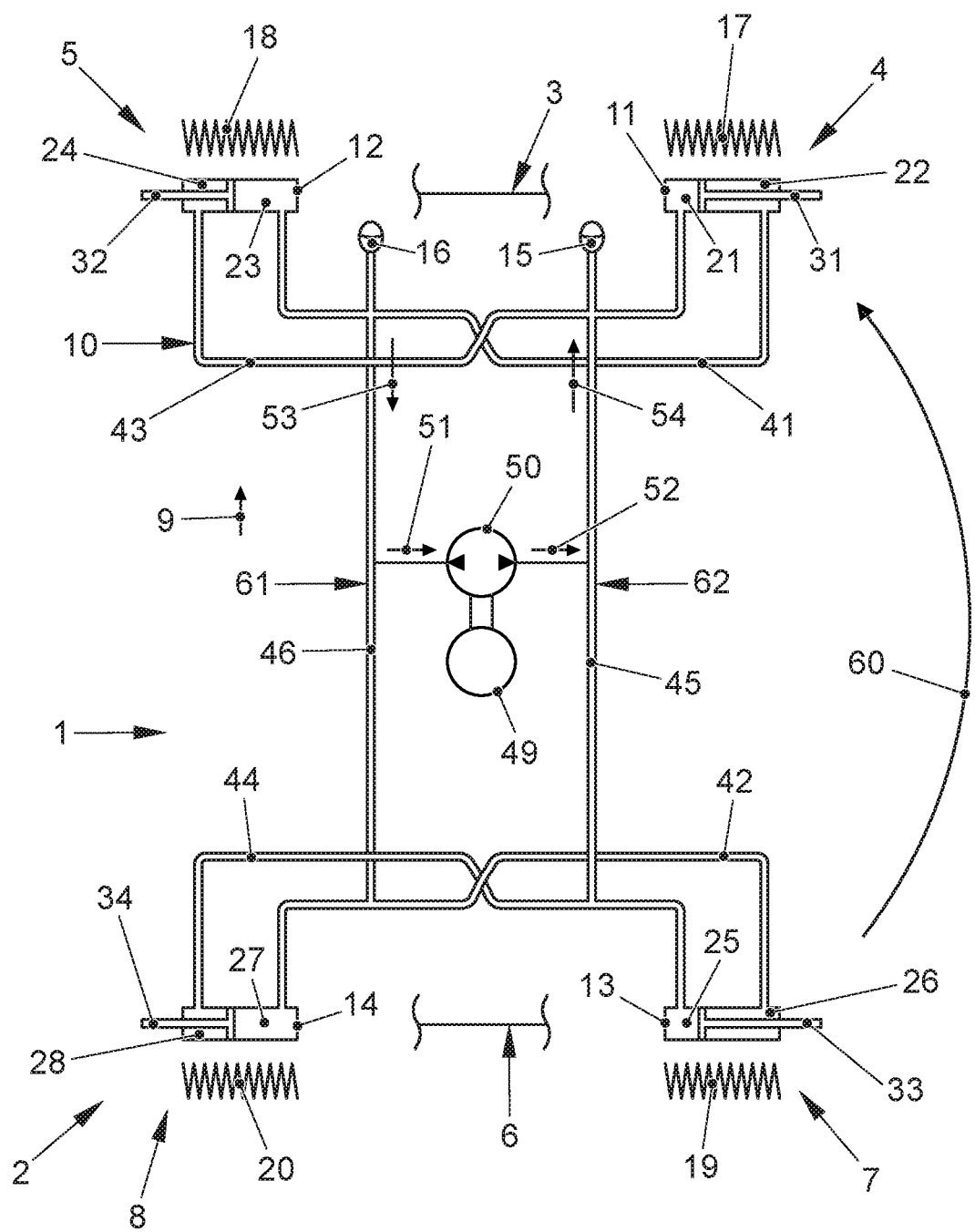

WHEEL SUSPENSION SYSTEM FOR A MOTOR VEHICLE

CROSS-REFERENCE TO RELATED APPLICATION

This application, claims priority to German Patent Application No. DE 10 2018 101 294.2, filed Jan. 22, 2018, the contents of such application being incorporated by reference herein in their entirety.

FIELD OF THE INVENTION

The invention relates to a wheel suspension system for a motor vehicle, which comprises a front axle having two front wheels, to each of which a front hydraulic cylinder is assigned, and a rear axle having two rear wheels, to each of which a rear hydraulic cylinder is assigned, wherein the hydraulic cylinders in a hydraulic system are connected crosswise hydraulically on each axle. The invention furthermore relates to a method for operating a wheel suspension system of this kind.

BACKGROUND OF THE INVENTION

German Laid-Open Application DE 10 2006 028 511 A1, which is incorporated by reference herein, discloses a suspension system comprising: a first shock damper, a second shock damper, a first connecting line extending between the first and the second shock damper; a second connecting line extending between the first and the second shock damper; and an open-loop/closed-loop control unit connected to the first and the second shock damper, German Laid-Open Application DE 10 2008 028 676 A1, which is incorporated by reference herein, discloses a roll control system comprising: first and second dampers, each containing a fluid; a pump, which is connected fluidically between the first and the second damper; a motor connected to the pump and a controller in communication with the motor, wherein the controller is configured, in response to a roll signal, to command the motor to drive the pump, wherein the pump supplies fluid in a desired direction from one of the first and the second damper to the other of the first and the second damper as a response to being driven by the motor. German Laid-Open Application DE 102 16 132 A1, which is incorporated by reference herein, discloses an active running gear system of a vehicle, in particular of a passenger car having at least one axle with two wheels, wherein a vehicle wheel is supported on the vehicle body via a hydraulic piston-cylinder unit, which acts as a damper and hydraulic actuator for the introduction of an additional force between the wheel and the body, wherein each of the actuator working chambers, which are provided on both sides of the piston in the cylinder of the piston-cylinder unit and the cross-sectional areas of which are different, is assigned a hydraulic supply line, via which either the same hydraulic pressure supplied by a feed pump can be applied to both working chambers or a lower hydraulic pressure, set by means of a pressure control valve, can be applied to the working chamber with the larger cross-sectional area than to the other working chamber, wherein the feed pump takes the hydraulic medium from the outlet of the pressure control valve, at least at certain operating points.

SUMMARY OF THE INVENTION

It is desirable to implement roll stabilization in a wheel suspension system for a motor vehicle, which comprises a front axle having two front wheels, to each of which a front hydraulic cylinder is assigned, and a rear axle having two rear wheels, to each of which a rear hydraulic cylinder is assigned, wherein the hydraulic cylinders in a hydraulic system are connected crosswise hydraulically on each axle.

Described herein is a wheel suspension system for a motor vehicle which comprises a front axle having two front wheels, to each of which a front hydraulic cylinder is assigned, and a rear axle having two rear wheels, to each of which a rear hydraulic cylinder is assigned, wherein the hydraulic cylinders in a hydraulic system are connected crosswise hydraulically on each axle, by virtue of the fact that a hydraulic pump in the hydraulic system is connected hydraulically between the two hydraulic subsystem order to implement active roll stabilization. The wheel suspension system preferably in each case comprises a spring and a hydraulic cylinder for each wheel. The spring and the hydraulic cylinder are advantageously used to isolate a sprung part of the motor vehicle from the wheels and axles of the motor vehicle in terms of oscillation and to damp the wheel and the body when the wheels of the motor vehicle are rolling over irregularities on a road surface. Furthermore, unwanted movements of the motor vehicle, especially rolling movements when cornering, can be subjected to open-loop and/or closed-loop control by means of the wheel suspension system. The hydraulic cylinders are embodied as double-acting hydraulic cylinders with a piston which separates in each case two cylinder chambers in the hydraulic cylinder. The cylinder chambers of the hydraulic cylinders are connected hydraulically to one another via hydraulic lines and are combined with damping valve devices which, together with the crosswise connection of the hydraulic cylinders, serve to stabilize unwanted rolling movements of the motor vehicle during operation. By means of the hydraulic pump, a positive or negative pressure difference in the hydraulic system can be built up actively between the crosswise connected hydraulic cylinders. An active hydraulic roll stabilization system is thereby provided in a simple manner.

A preferred illustrative embodiment of the wheel suspension system is characterized in that the hydraulic pump is embodied as a reversing pump. The hydraulic pump embodied as a reversing pump can deliver hydraulic medium in two opposite directions.

Another preferred illustrative embodiment of the wheel suspension system is characterized in that the hydraulic pump is connected between a first hydraulic subsystem and a second hydraulic subsystem. Thus, hydraulic medium can be delivered from the first hydraulic subsystem to the second hydraulic subsystem by means of the hydraulic pump. The pressure in the second hydraulic subsystem is then increased, while the pressure in the first hydraulic subsystem falls. Active roll stabilization on a corresponding bend can thus be provided in a simple manner.

Another preferred illustrative embodiment of the wheel suspension system is characterized in that the first hydraulic subsystem comprises a hydraulic connection between the two front hydraulic cylinders, a hydraulic connection between the two rear hydraulic cylinders, and a first hydraulic pressure accumulator. Emanating from the first hydraulic accumulator there is advantageously a hydraulic line which connects the two hydraulic cross-connections of the two axles to one another.

Another preferred illustrative embodiment of the wheel suspension system is characterized in that the second hydraulic subsystem comprises a hydraulic connection between the two front hydraulic cylinders, a hydraulic connection between the two rear hydraulic cylinders, and a second hydraulic pressure accumulator. Emanating from the second hydraulic accumulator there is advantageously a hydraulic line which connects the two hydraulic cross-connections of the two axles to one another.

Another preferred illustrative embodiment of the wheel suspension system is characterized in that the hydraulic pump is connected between a hydraulic line of the first hydraulic subsystem and a hydraulic line of the second hydraulic subsystem. The two hydraulic lines advantageously correspond to the above-described hydraulic lines which emanate from the hydraulic pressure accumulators. By means of this arrangement of the hydraulic pump, effective active roll stabilization can be provided in a simple manner.

Another preferred illustrative embodiment is the use of a hydraulic pump between the hydraulic lines on each axle. Thus, the connecting lines between the front and rear axles are eliminated and variable rolling moment distribution can be implemented.

Another preferred illustrative embodiment is the use of additional valves, which can connect the hydraulic ports on the hydraulic cylinders directly to one another, ensuring that inward and outward deflections lead to lower pressure changes in the hydraulic accumulators.

In a method for operating an above-described wheel suspension system, the hydraulic pump is used to actively initiate pressure increases and pressure reliefs in the crosswise-connected hydraulic cylinders for the purpose of active roll stabilization. Comfortable damping and roll stabilization in the wheel suspension system can thereby be achieved in a simple manner.

Also described herein is a computer program product having a program code for carrying out an above-described method. The computer program is preferably carried out in a control unit for controlling a roll stabilization process in the motor vehicle.

Also described herein is a control unit for controlling a roll stabilization process by means of an above-described computer program product. A speed, a steering wheel angle, a transverse acceleration and/or levels of the motor vehicle are used as input variables for the control unit, for example. The computer program product contains suitable logic and calculation formulae to determine from the input variables a suitable pressure and/or a suitable flow, which is produced in the hydraulic system with the aid of the hydraulic pump. The hydraulic pump is advantageously controlled by means of a rotational speed control system or by means of a pressure control system.

Also described herein is a motor vehicle having an above-described wheel suspension system, in particular having an above-described control unit.

BRIEF DESCRIPTION OF THE DRAWING

Further advantages, features and details of the invention will become apparent from the following description, in which various illustrative embodiments are described in detail with reference to the drawing.

The FIG. illustrates a wheel suspension system for a motor vehicle having a hydraulic system, which comprises a hydraulic pump to form an active roll stabilization system.

DETAILED DESCRIPTION OF THE INVENTION

In the attached FIGURE, a motor vehicle 1 having a wheel suspension system 2 is illustrated in simplified form. A front axle having a front right-hand wheel 4 and a front left-hand wheel 5 at its ends is indicated by a line 3. A rear axle having a rear right-hand wheel 7 and a rear left-hand wheel 8 at its ends is indicated by a line 6.

A direction of forward travel with the motor vehicle 1 traveling straight ahead is indicated by an arrow 9. The wheel suspension system 2 is combined with a hydraulic system 10. The hydraulic system 10 comprises four hydraulic cylinders 11 to 14, which are embodied as double-acting cylinders, each having one piston.

Hydraulic cylinder 11 is assigned to the front right-hand wheel 4, and is therefore also referred to as the front right-hand hydraulic cylinder 11. Hydraulic cylinder 12 is assigned to the front left-hand front wheel 5 and is therefore also referred to as the front left-hand hydraulic cylinder 12. Hydraulic cylinder 13 is assigned to the rear right-hand wheel 7 and is therefore also referred to as the rear right-hand hydraulic cylinder 13. Hydraulic cylinder 14 is assigned to the rear left-hand wheel 8 and is therefore also referred to as the rear left-hand hydraulic cylinder 14.

The hydraulic system 10 furthermore comprises at least two hydraulic pressure accumulators 15, 16. Furthermore, each hydraulic cylinder 11 to 14 in the wheel suspension system 2 is assigned a spring 17 to 20. The springs 17 to 20 are embodied as helical springs and, during operation, perform movements substantially parallel to the pistons in the hydraulic cylinders 11 to 14.

Hydraulic cylinder 11 comprises a first cylinder chamber 21 and a second cylinder chamber 22. Hydraulic cylinder 12 comprises a first cylinder chamber 23 and a second cylinder chamber 24. Hydraulic cylinder 13 comprises a first cylinder chamber 25 and a second cylinder chamber 26. Hydraulic cylinder 14 comprises a first cylinder chamber 27 and a second cylinder chamber 28.

A piston rod 31 of hydraulic cylinder 11 extends to the right through the second cylinder chamber 22 in the FIGURE. A piston rod 32 extends to the left through the second cylinder chamber 24 of hydraulic cylinder 12 in the FIGURE. A piston rod 33 extends to the right through the second cylinder chamber 26 of hydraulic cylinder 13 in the FIGURE. A piston rod 34 extends to the left through the second cylinder chamber 28 of hydraulic cylinder 14 in the FIGURE.

A hydraulic line 41 connects the second cylinder chamber 22 of the front right-hand hydraulic cylinder 11 to the first cylinder chamber 23 of the front left-hand hydraulic cylinder 12. A hydraulic line 42 connects the second cylinder chamber 26 of the rear right-hand hydraulic cylinder 13 to the first cylinder chamber 27 of the rear left-hand hydraulic cylinder 14. Hydraulic lines 41 and 42 are also referred to as connections and belong to a first hydraulic subsystem 61.

A hydraulic line 43 connects the first cylinder chamber 21 of the front right-hand hydraulic cylinder 11 to the second cylinder chamber 24 of the front left-hand hydraulic cylinder 12. A hydraulic line 44 connects the first cylinder chamber 25 of the rear right-hand hydraulic cylinder 13 to the second cylinder chamber 28 of the rear left-hand hydraulic cylinder 14. The two hydraulic lines 43 and 44 are also referred to as connections and belong to a second hydraulic subsystem 62.

A hydraulic line 45 connects the hydraulic pressure accumulator 15 in the second hydraulic subsystem 62 to connection 43 and to connection 44. A hydraulic line 46 connects the hydraulic pressure accumulator 16 in the first hydraulic subsystem 61 to connection 41 and to connection 42.

A hydraulic pump 50 is connected hydraulically between hydraulic lines 45 and 46. The hydraulic pump 50 is embodied as a reversing pump and can be driven in opposite directions by an electric motor 49. Arrows 51 and 52 in the FIGURE indicate that the hydraulic pump 50 delivers hydraulic medium from the hydraulic line 46 of the first hydraulic subsystem 61 to the hydraulic line 45 of the second hydraulic subsystem 62 when the motor vehicle 1 drives around a left-hand bend indicated by a curved arrow 60.

An arrow 54 indicates that the pressure in hydraulic line 45 and in the hydraulic pressure accumulator 15 in the second hydraulic subsystem 62 is being increased by the hydraulic pump 50. At the same time, an arrow 53 indicates that the pressure in the hydraulic pressure accumulator 16 and the hydraulic line 46 of the first hydraulic subsystem 61 is reduced when the hydraulic pump 50 is operated in this delivery direction 51, 52.

The hydraulic pump 50 connects the two hydraulic subsystems 61, 62, which are also referred to as hydraulic circuits 61, 62. By means of the hydraulic pump 50, hydraulic fluid can be delivered from the first hydraulic circuit 61 to the second hydraulic circuit 62 and vice versa.

If the hydraulic pump 50, which is also referred to as "pump" for short, delivers hydraulic fluid from the first hydraulic circuit 61 to the second hydraulic circuit 62, the pressure in the second hydraulic circuit 62 is increased and the pressure in the first hydraulic circuit 61 is reduced. In this way, active roll stabilization for a left-hand bend 60 is possible.

For a right-hand bend, delivery must take place from the second hydraulic circuit 62 to the first hydraulic circuit 61. The resulting pressure difference between the hydraulic circuits 61 and 62 enables active roll stabilization.

What is claimed is:

1. A wheel suspension system for a motor vehicle, said wheel suspension system comprising:
    a front axle having two front wheels, to each of which a front hydraulic cylinder is assigned,
    a rear axle having two rear wheels, to each of which a rear hydraulic cylinder is assigned, wherein the front and rear hydraulic cylinders are hydraulically connected crosswise, and
    a hydraulic system comprising the front and rear hydraulic cylinders and a reversible hydraulic pump that is connected hydraulically between a first hydraulic subsystem and a second hydraulic subsystem in order to implement active roll stabilization, wherein, in one rotational direction of the reversible hydraulic pump, the pump is configured to supply fluid from the first hydraulic subsystem to the second hydraulic subsystem, thereby actively increasing a fluid pressure in the second hydraulic subsystem and actively decreasing a fluid pressure in the first hydraulic subsystem, and, in an opposite rotational direction of the reversible hydraulic pump, the pump is configured to supply fluid from the second hydraulic subsystem to the first hydraulic subsystem, thereby actively increasing a fluid pressure in the first hydraulic subsystem and actively decreasing a fluid pressure in the second hydraulic subsystem,
    wherein the first hydraulic subsystem comprises a hydraulic connection between the two front hydraulic cylinders, a hydraulic connection between the two rear hydraulic cylinders, and a first hydraulic pressure accumulator, and
    wherein the second hydraulic subsystem comprises a hydraulic connection between the two front hydraulic cylinders, a hydraulic connection between the two rear hydraulic cylinders, and a second hydraulic pressure accumulator.

2. The wheel suspension system as claimed in claim 1, wherein the hydraulic pump is connected between a hydraulic line of the first hydraulic subsystem and a hydraulic line of the second hydraulic subsystem.

3. A computer program product having a program code for implementing the active roll stabilization as claimed in claim 1.

4. A control unit for controlling a roll stabilization process by means of the computer program product as claimed in claim 3.

5. The control unit as claimed in claim 4, wherein the control unit receives, as inputs, a speed, a steering wheel angle, and/or a transverse acceleration of the motor vehicle, and, based upon the inputs, controls an electric motor connected to the reversible hydraulic pump for driving the reversible hydraulic pump.

6. A motor vehicle having the wheel suspension system as claimed in claim 1.

7. The wheel suspension system as claimed in claim 1, wherein each of the front and rear hydraulic cylinders has a damper valve.

8. The wheel suspension system as claimed in claim 1, wherein the first hydraulic subsystem is fluidly connected to the second hydraulic subsystem by only the reversible hydraulic pump.

9. The wheel suspension system as claimed in claim 1, further comprising an electric motor connected to the reversible hydraulic pump for driving the reversible hydraulic pump.

* * * * *